US012728922B2

(12) United States Patent
Cho et al.

(10) Patent No.: US 12,728,922 B2
(45) Date of Patent: Sep. 8, 2026

(54) AUTO PARKING ASSISTANCE MDPS SYSTEM AND CONTROL METHOD THEREOF

(71) Applicant: HYUNDAI MOBIS CO., LTD., Seoul (KR)

(72) Inventors: Jung Min Cho, Yongin-si (KR); Kyu Ha Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 30 days.

(21) Appl. No.: 18/944,751

(22) Filed: Nov. 12, 2024

(65) Prior Publication Data

US 2025/0153772 A1 May 15, 2025

(30) Foreign Application Priority Data

Nov. 14, 2023 (KR) ........................ 10-2023-0157295

(51) Int. Cl.
*B62D 15/02* (2006.01)
*B60W 30/06* (2006.01)

(52) U.S. Cl.
CPC ......... *B62D 15/0285* (2013.01); *B60W 30/06* (2013.01)

(58) Field of Classification Search
CPC ........................... B62D 15/0285; B60W 30/06
See application file for complete search history.

(56) References Cited

U.S. PATENT DOCUMENTS

| | | | | |
|---|---|---|---|---|
| 10,730,553 | B2 * | 8/2020 | Raad | B62D 13/005 |
| 11,052,940 | B1 * | 7/2021 | Narasimhan | B62D 5/001 |
| 2009/0207045 | A1 * | 8/2009 | Jung | G06T 7/74 340/932.2 |
| 2019/0031194 | A1 * | 1/2019 | Kim | B60W 30/06 |
| 2022/0032925 | A1 * | 2/2022 | Liu | B60W 40/10 |
| 2022/0169247 | A1 * | 6/2022 | Borrello | B60W 60/0011 |
| 2022/0402542 | A1 * | 12/2022 | Otogawa | B62D 5/0463 |
| 2023/0139551 | A1 * | 5/2023 | Zhao | B60W 30/09 701/26 |
| 2023/0226925 | A1 * | 7/2023 | Porter | B60L 15/2018 701/22 |

FOREIGN PATENT DOCUMENTS

KR 10-2014-0098443 A 8/2014

* cited by examiner

*Primary Examiner* — Long T Tran
(74) *Attorney, Agent, or Firm* — Morgan, Lewis & Bockius LLP

(57) ABSTRACT

Provided is an auto parking assistance MDPS system, which includes a command interpolator configured to interpolate and receive a position command, and an MDPS controller configured to generate and output a position command by adjusting an interpolated position command from the command interpolator based on a feedback angle output from a motor driven power steering (MDPS) plant.

8 Claims, 5 Drawing Sheets

FIG.1

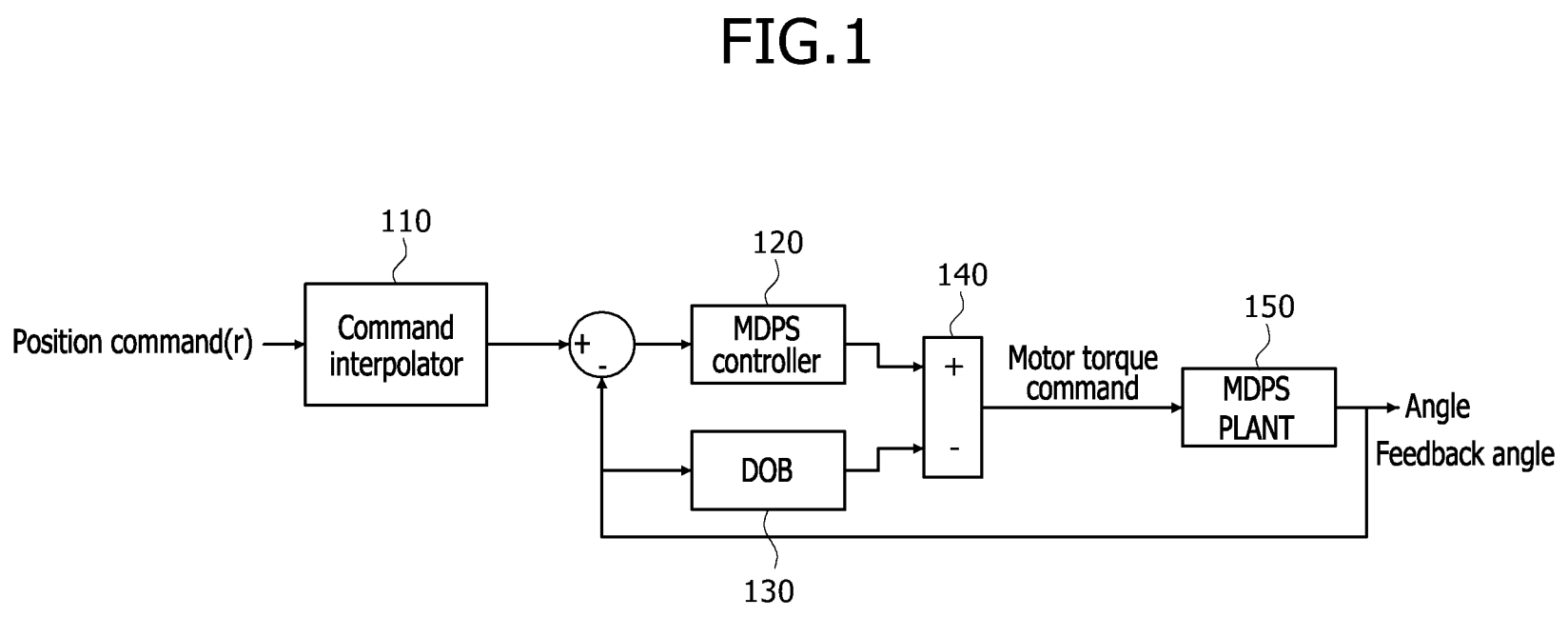

Position command(r)
110
Command interpolator
+
-
120
MDPS controller
DOB
130
140
+
-
Motor torque command
150
MDPS PLANT
Angle
Feedback angle

FIG.2

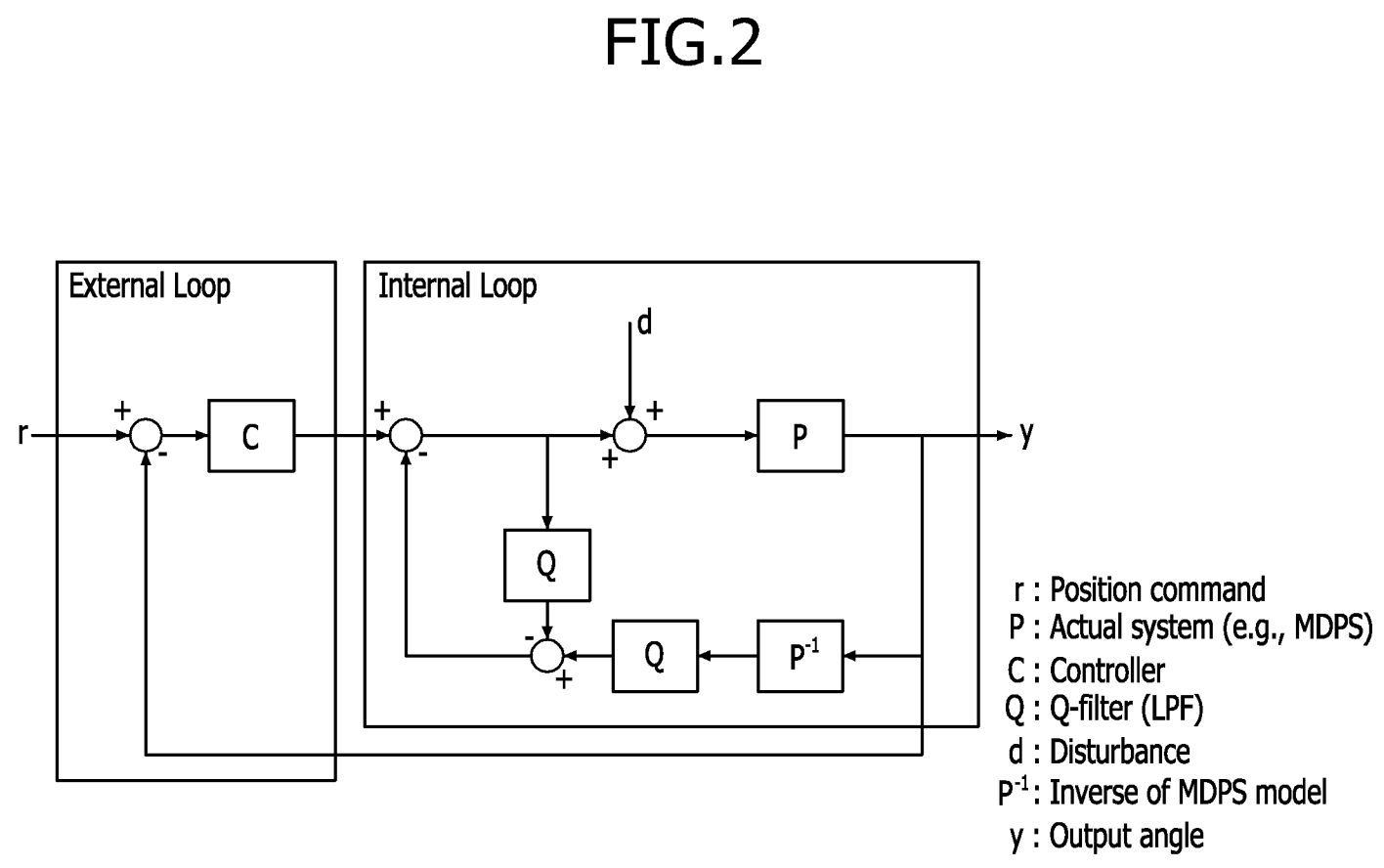

External Loop
Internal Loop
r
C
P
$P^{-1}$
Q
Q
d
y
+
-
+
+
- r : Position command
P : Actual system (e.g., MDPS)
C : Controller
Q : Q-filter (LPF)
d : Disturbance
$P^{-1}$ : Inverse of MDPS model
y : Output angle

AUTO PARKING ASSISTANCE MDPS SYSTEM AND CONTROL METHOD THEREOF

CROSS-REFERENCE TO RELATED APPLICATION

This application claims priority from and the benefit of Korean Patent Application No. 10-2023-0157295, filed on Nov. 14, 2023, which is hereby incorporated by reference for all purposes as if set forth herein.

BACKGROUND

Field

Exemplary embodiments of the present disclosure relate to an auto parking assistance MDPS system and a control method thereof.

Discussion of the Background

Recently, there have been efforts to apply IT technology to vehicles.

An example of a motor driven power steering (MDPS) application is an auto parking assistance (APA) system.

This refers to a system that uses cameras and vehicle sensors to search for parking spaces and controls the steering wheel to assist a driver with parking and unparking.

More specifically, the APA system and MDPS system work in conjunction, where the APA system sends a steering angle command (i.e., position command) to the MDPS system through controller area network (CAN). The MDPS system then drives a steering motor in accordance with the steering angle command (i.e., position command).

However, as various electronic control systems (i.e., electronic controllers) related to safety and autonomous driving have recently increased in vehicles, the load rate of CAN has also steadily increased. As a result, the transmission cycle of steering angle command (i.e., position command) output from the APA system to the CAN needs to be delayed (e.g., 5 ms→20 ms).

Due to the delayed transmission cycle, when the steering angle command (i.e., position command) is output (updated), the gap in the steering angle increases, which may cause ripple or noise during steering. Applying a low-pass filter (LPF) to address this issue may result in delayed response performance.

Furthermore, disturbances that interfere with auto parking assistance (e.g., maximum load conditions, high friction road surfaces, slopes) may result in degraded response performance.

Therefore, there is a need for a technology that applies interpolation logic to a steering angle command (i.e., position command) input to the MDPS system through the CAN. For instance, when the performance cycle of position control is faster than the CAN signal transmission cycle, an interpolated position command using a moving average filter may be input to reduce the degradation of position control performance. Furthermore, a disturbance observer (DOB) may be added to support high-power maintenance under maximum load conditions.

The related art of the present disclosure is disclosed in Korean Patent Application Publication No. 10-2014-0098443 (published on Aug. 8, 2014, and entitled "SMART PARKING ASSIST SYSTEM WITH INTEGRATED CAMERA AND AUTOMATIC PARKING METHOD THEREOF").

SUMMARY

Exemplary embodiments of the present disclosure relate to an auto parking assistance MDPS system and a control method thereof that apply interpolation logic to a steering angle command (i.e., position command) input to the MDPS system through controller area network (CAN). An interpolated position command using a moving average filter is input to reduce the degradation of position control performance. Furthermore, a disturbance observer (DOB) is added to support high-power maintenance under maximum load conditions.

In an aspect of the present disclosure, the auto parking assistance MDPS system includes a command interpolator configured to interpolate and receive a position command, and an MDPS controller configured to generate and output a position command by adjusting an interpolated position command from the command interpolator based on a feedback angle output from a motor driven power steering (MDPS) plant.

In an embodiment of the present disclosure, the command interpolator calculates and outputs a moving average of the position command over a specified time window when the position command is input.

In an embodiment of the present disclosure, the MDPS controller is implemented as a proportional integral differential (PID) controller or a P-PI controller.

In an embodiment of the present disclosure, the auto parking assistance MDPS system further includes a disturbance observer configured to detect a disturbance included in the feedback angle output from the MDPS plant.

In an embodiment of the present disclosure, the auto parking assistance MDPS system further includes an adder configured to add the disturbance detected by the disturbance observer to the position command output from the MDPS controller, thereby generating an adjusted motor torque command and outputting this command to the MDPS plant.

In another aspect of the present disclosure, the control method of an auto parking assistance MDPS system includes interpolating and receiving, by a command interpolator, a position command, and generating and outputting, by an MDPS controller, a position command by adjusting an interpolated position command from the command interpolator based on a feedback angle output from a motor driven power steering (MDPS) plant.

In an embodiment of the present disclosure, in the interpolating and receiving of a position command, the command interpolator calculates and outputs a moving average of the position command over a specified time window when the position command is input.

In an embodiment of the present disclosure, in the generating and outputting of a position command, the MDPS controller is implemented as a proportional integral differential (PID) controller or a P-PI controller.

In an embodiment of the present disclosure, the control method further includes detecting, by a disturbance observer, a disturbance included in the feedback angle output from the MDPS plant.

In an embodiment of the present disclosure, the control method further includes adding, by an adder, the disturbance detected by the disturbance observer to the position command output from the MDPS controller, thereby generating an adjusted motor torque command and outputting this command to the MDPS plant.

The auto parking assistance MDPS system and the control method thereof may apply interpolation logic to a steering angle command (i.e., position command) input to the MDPS system through the controller area network (CAN). In other words, an interpolated position command using a moving average filter may be input to reduce the degradation of position control performance. Furthermore, a disturbance observer (DOB) may be added to support high-power maintenance under maximum load conditions.

BRIEF DESCRIPTION OF THE DRAWINGS

FIG. 1 is an illustrative diagram showing a schematic configuration of an auto parking assistance MDPS system according to an embodiment of the present disclosure.

FIG. 2 is an illustrative diagram showing a more detailed configuration of the auto parking assistance MDPS system in FIG. 1.

DETAILED DESCRIPTION OF THE ILLUSTRATED EMBODIMENTS

Figure 3:
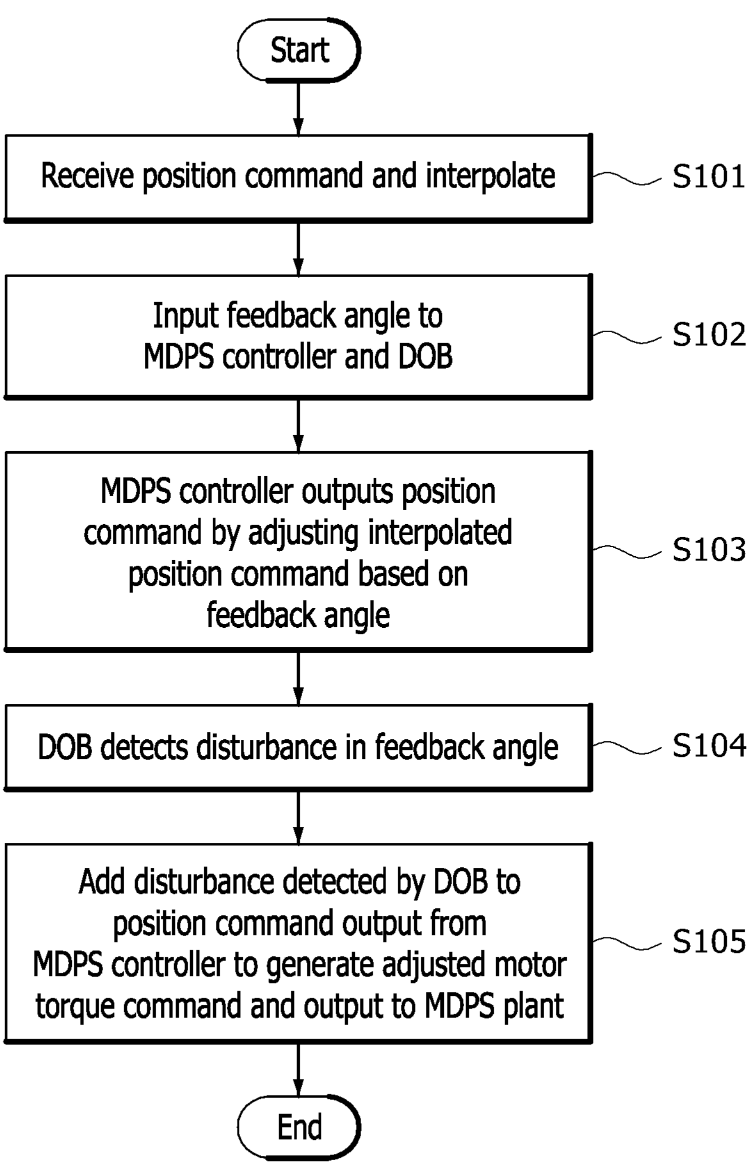
FIG. 3 is a flowchart illustrating a control method of an auto parking assistance MDPS system according to another embodiment of the present disclosure.

Embodiments of an auto parking assistance MDPS system and a control method thereof according to the present disclosure will be described hereinafter in detail with reference to the accompanying drawings.

It should be noted that the drawings are not to precise scale and may be exaggerated in thickness of lines or sizes of elements for descriptive convenience and clarity only. Furthermore, the terms as used herein are defined by taking functions of the disclosure into account and can be changed according to the custom or intention of users or operators. Therefore, definition of the terms should be made according to the overall disclosures set forth herein.

Hereinafter, exemplary embodiments of the present disclosure will be described in detail with reference to the accompanying drawings so that those skilled in the art may easily practice the present disclosure. However, the present disclosure may be implemented in various different forms and is not limited to the exemplary embodiments provided in the present description. Furthermore, portions unrelated to the description are omitted to clearly describe the present disclosure, and components that are the same as or similar will be denoted by the same reference numerals throughout the specification.

When one part is referred to as "comprising" (or "including" or "having") other elements, it should be understood that it can comprise (or include or have) only those elements, or it can comprise (or include or have) other elements as well as those elements unless specifically described otherwise.

An implementation described in this specification may be realized as a method or process, apparatus, software program, data stream or signal, for example. Although the disclosure has been discussed only in the context of a single form of implementation (e.g., discussed as only a method), an implementation with the discussed characteristic may also be realized in another form (e.g., apparatus or program). The apparatus may be implemented as proper hardware, software or firmware. The method may be implemented in an apparatus, such as a processor commonly referring to a processing device, including a computer, a microprocessor, an integrated circuit or a programmable logic device, for example.

FIG. 1 is an illustrative diagram showing a schematic configuration of an auto parking assistance MDPS system according to an embodiment of the present disclosure.

As shown in FIG. 1, an auto parking assistance MDPS system includes a command interpolator 110, an MDPS controller 120, a disturbance observer (DOB) 130, an adder 140, and an MDPS plant 150.

When a position command r is input from an auto parking assistance (APA) system, the command interpolator 110 calculates and outputs a moving average $\text{mean}_k$ of the position command r over a specified time window, as shown in the following formula (see FIG. 4).

$$\text{mean}_k = \frac{x_{k-n+1} + x_{k-n+2} + \ldots + x_k}{n}$$

Since the command interpolator 110 performs signal processing while considering recent changes in the position command r over a specified window, the command interpolator 110 outputs a stable position command (i.e., interpolated position command) even in the case of abrupt changes in the position command.

The command interpolator 110 may be implemented as a moving average filter.

Figure 4:
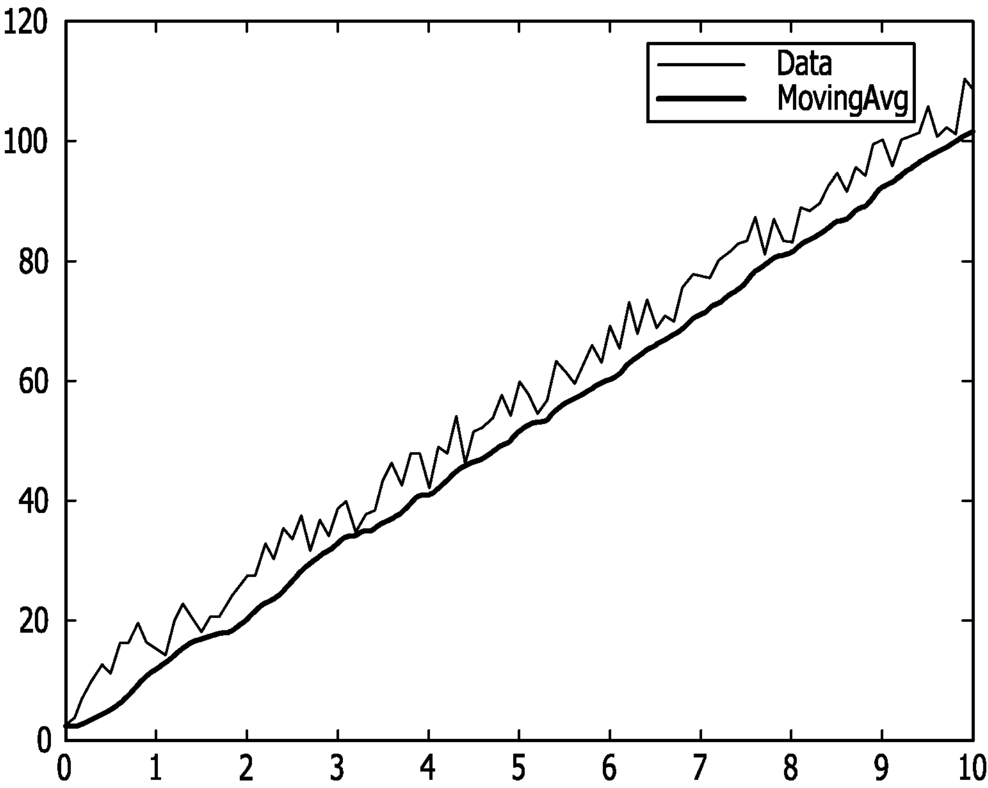
FIG. 4 is an illustrative diagram in graph form showing a position command interpolated and output using a moving average method by a command interpolator in FIG. 1.

FIG. 4 is an illustrative diagram in graph form showing a position command interpolated and output using a moving average method by the command interpolator in FIG. 1.

Referring back to FIG. 1, the MDPS controller 120 may be implemented as a proportional integral differential (PID) controller or a P-PI controller.

The MDPS controller 120 outputs a position command by adjusting the interpolated position command from the command interpolator 110 based on an angle (feedback angle) output from the MDPS plant 150.

The disturbance observer (DOB) 130 detects a disturbance d included in the angle (feedback angle) output from the MDPS plant 150.

The adder 140 adds the disturbance d detected by the disturbance observer 130 to the position command output from the MDPS controller 120, thereby generating an adjusted motor torque command and outputting this command to the MDPS plant 150.

The MDPS plant 150 refers to a mechanical device including a steering motor (not shown) that performs the actual steering in the MDPS system.

FIG. 2 is an illustrative diagram showing a more detailed configuration of the auto parking assistance MDPS system in FIG. 1.

Referring to FIG. 2, in an external loop, an MDPS controller C outputs a position command by adjusting the position command, interpolated using the moving average method, based on an angle (feedback angle) output from an MDPS plant P.

In an internal loop, a disturbance d is detected by adding the filtered position command, obtained using a Q-filter to filter a position command before the disturbance d is included, to the disturbance d included in the angle (feedback angle) output from the MDPS plant P.

The adder between the external loop and the internal loop adds the disturbance d detected by the internal loop to the position command output from the MDPS controller C in the external loop, thereby generating an adjusted position command (motor torque command) and outputting this command to the MDPS plant P in the internal loop.

FIG. 3 is a flowchart illustrating a control method of an auto parking assistance MDPS system according to another embodiment of the present disclosure.

Referring to FIG. 3, when a position command r is input from an auto parking assistance (APA) system, an MDPS controller 120 interpolates an input position command r through a command interpolator 110, utilizing a method of calculating and outputting a moving average $mean_k$ of the position command r over a specified time window (S101).

The MDPS controller 120 and a disturbance observer 130 receive a feedback angle (S102).

The MDPS controller 120 outputs a position command by adjusting the interpolated position command r from the command interpolator 110 based on the angle (feedback angle) output from an MDPS plant 150 (S103).

The disturbance observer 130 detects a disturbance d included in the angle (feedback angle) output from the MDPS plant 150 (S104).

An adder 140 adds the disturbance d detected by the disturbance observer 130 to the position command output from the MDPS controller 120, thereby generating an adjusted position command (motor torque command) and outputting this command to the MDPS plant 150 (S105).

Figure 5:
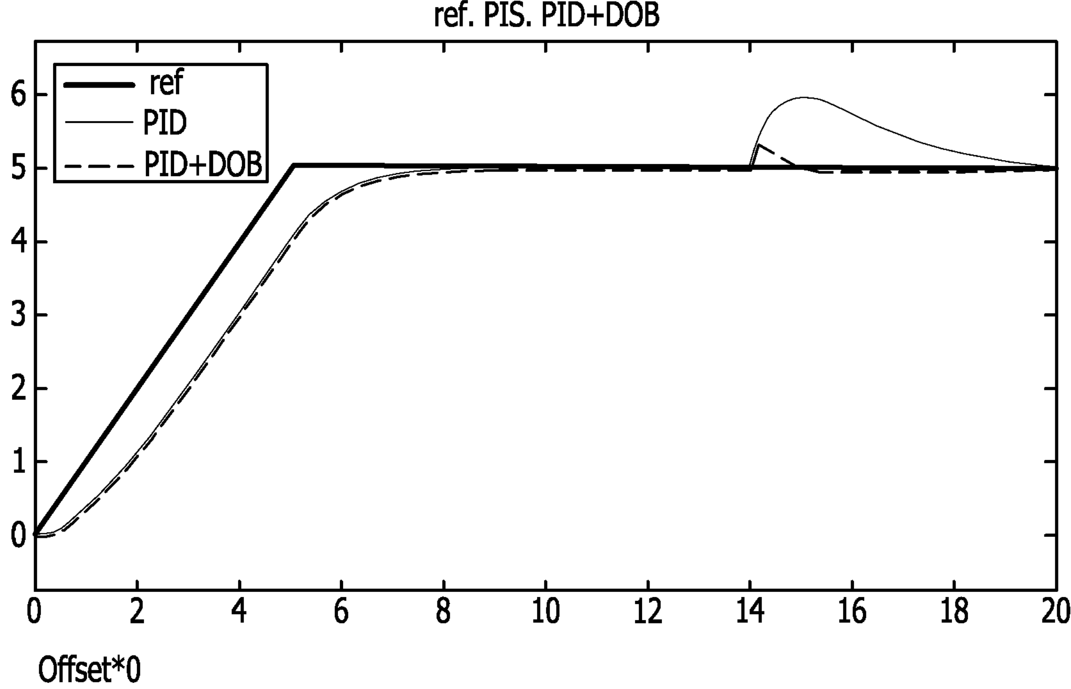
FIG. 5 is an illustrative diagram in graph form comparing the performance of an auto parking assistance MDPS system before and after applying a disturbance observer in FIG. 1.

FIG. 5 is an illustrative diagram in graph form comparing the performance of the auto parking assistance MDPS system before and after applying the disturbance observer in FIG. 1.

As illustrated, assuming the MDPS controller 120 is implemented as a PID controller and a disturbance occurs around 14 seconds, the MDPS controller 120 recovered (PID indicated by a solid line) from the disturbance at about 20 seconds before applying the disturbance observer 130, and the MDPS controller 120 quickly recovered (PID+DOB indicated by a dashed line) from the disturbance at about 15 seconds after applying the disturbance observer 130.

Furthermore, the interpolation of position command reduces system noise, even for fast responses.

As described above, the auto parking assistance MDPS system and the control method thereof may apply interpolation logic to a steering angle command (i.e., position command) input to the MDPS system through the controller area network (CAN). In other words, an interpolated position command using a moving average filter may be input to reduce the degradation of position control performance. Furthermore, a disturbance observer (DOB) may be added to support high-power maintenance under maximum load conditions.

Although embodiments of the present disclosure have been described with reference to the accompanying drawings, these embodiments are provided for the illustrative purpose. It will be apparent to those skilled in the art that various modifications and equivalent embodiments can be made from these embodiments disclosed herein. Thus, the true technical scope of the disclosure should be defined by the following claims.

What is claimed is:

1. A motor driven power steering (MDPS) system for an auto parking assistance, the system comprising:

a command interpolator configured to interpolate and receive a position command; and an MDPS controller configured to generate and output a position command by adjusting an interpolated position command from the command interpolator based on a feedback angle output from an MDPS plant, wherein the command interpolator is configured to calculate and output a moving average of the position command over a specified time window when the position command is input.

2. The system of claim 1, wherein the MDPS controller is implemented as a proportional integral differential (PID) controller or a Proportional-Proportional Integral (P-PI) controller.

3. A motor driven power steering (MDPS) system for an auto parking assistance, the system comprising:

a command interpolator configured to interpolate and receive a position command;

an MDPS controller configured to generate and output a position command by adjusting an interpolated position command from the command interpolator based on a feedback angle output from an MDPS plant; and a disturbance observer configured to detect a disturbance included in the feedback angle output from the MDPS plant.

4. The system of claim 1, further comprising an adder configured to add a disturbance detected by a disturbance observer to the position command output from the MDPS controller to generate an adjusted motor torque command and output the adjusted motor torque command to the MDPS plant.

5. A control method of an auto parking assistance by a motor driven power steering (MDPS) system, the control method comprising:

interpolating and receiving, by a command interpolator, a position command; and generating and outputting, by an MDPS controller, a position command by adjusting an interpolated position command from the command interpolator based on a feedback angle output from an MDPS plant, wherein in the interpolating and receiving of a position command, the command interpolator calculates and outputs a moving average of the position command over a specified time window when the position command is input.

6. The control method of claim 5, wherein, in the generating and outputting of a position command, the MDPS controller is implemented as a proportional integral differential (PID) controller or a Proportional-Proportional Integral (P-PI) controller.

7. The control method of claim 5, further comprising detecting, by a disturbance observer, a disturbance included in the feedback angle output from the MDPS plant.

8. The control method of claim 5, further comprising adding, by an adder, a disturbance detected by a disturbance observer to the position command output from the MDPS controller to generate an adjusted motor torque command and output the adjusted motor torque command to the MDPS plant.

* * * * *